United States Patent [19]

Seitz et al.

[11] Patent Number: 4,536,659
[45] Date of Patent: Aug. 20, 1985

[54] VISIBLE DISCONNECT/GROUND SWITCH

[75] Inventors: James P. Seitz, Burlington; Michael Helmers, Hopewell, both of N.J.

[73] Assignee: NWL Transformers, Bordentown, N.J.

[21] Appl. No.: 533,862

[22] Filed: Sep. 20, 1983

[51] Int. Cl.³ .................. H02J 3/14; H01H 33/54
[52] U.S. Cl. .................. 307/41; 307/115; 307/139; 307/140; 200/17 R; 200/148 B; 361/333; 361/335
[58] Field of Search .................. 307/38, 41, 113, 115, 307/139, 140; 200/17 R, 148 R, 148 B, 148 D; 361/332, 333, 335

[56] References Cited

U.S. PATENT DOCUMENTS 3,114,816 12/1963 Beatty .................. 250/148 B
3,725,623 4/1973 Fischer et al. .................. 200/148 B
4,092,547 5/1978 Ruppert .................. 307/113

Primary Examiner—A. D. Pellinen
Assistant Examiner—Derek S. Jennings
Attorney, Agent, or Firm—Ratner & Prestia

[57] ABSTRACT

An improved disconnect/ground switch assembly for use in conjunction with a high voltage DC power supply is disclosed. High voltage rectified DC power is provided on a conductor through an insulating bushing. An electrically conductive contacting mechanism mounted on the end of the bushing and in electrical contact with the conductor serves as a source of power for driving a pair of loads through respectively associated switching contact members. Actuating mechanisms for switching either or both of the switch contacts to associated grounded contacts are shown. Opposed apertures in the switch housing are adapted for receiving load driving conductors positioned in conductor conduits. A transparent covering of a viewing aperture for observing the positions of the switch contacts is shown.

12 Claims, 8 Drawing Figures

| HV CONTACT | HIGH VOLTAGE SWITCH POSITION | | | | |
|---|---|---|---|---|---|
| | I | II | III | IV | V |
| A | GND | FW | FW | HW | GND |
| B | GND | GND | FW | HW | FW |

HV = HIGH VOLTAGE
GND = GROUND
FW = FULL WAVE
HW = HALF WAVE

| FIELD | MODES OF OPERATION | | | |
|---|---|---|---|---|
| | 1 | 2 | 3 | 4 |
| A | GND | FW | FW | GND |
| B | GND | GND | FW | FW |

GND = GROUND
FW = FULL WAVE

VISIBLE DISCONNECT/GROUND SWITCH

BACKGROUND OF THE INVENTION

1. Field of the Invention

This invention relates to a switching mechanism for disconnecting apparatus from a high voltage DC power supply including a switching mechanism for making ground connections. More particularly, it relates to a high voltage switching mechanism that can be directly mounted on a power supply housing. Still more particularly, it relates to an improved high voltage switching mechanism capable of receiving power from a single bushing and selectively allowing power to be applied to one or a pair of loads.

2. State of the Prior Art

It is known to be desirable to have a high power DC power supply for industrial uses. One well known application of such DC power supplies is to power electrostatic precipitators for pollution control. To supply such DC power, it has been common to utilize a step-up transformer powered from conventional power lines, to drive rectifier circuits. It is common to have a housing for the transformer/rectifier (T/R), and to have the T/R circuitry immersed in oil for enhanced cooling. The relatively high DC voltages, for example in range of 50,000 volts, also requires attention to electrical insulation requirements.

In addition to the T/R circuitry, it has been common to utilize a high voltage switch (HVS) for providing multiple selections of modes of operation for one or two loads driven simultaneously. It has been common to locate the HVS within the T/R housing, and for it to be also immersed in oil. The HVS has essentially provided for five sets of switch selection positions for use with two loads such as the fields of two precipitators. The HVS selections provide for the selections of grounding both loads, providing full wave rectified voltage to either output while grounding the other, providing full wave rectified voltage to both outputs, or providing half wave rectified voltage to both outputs. Various ones of these selections will be discussed further below.

The HVS provides selected output voltages on a pair of electrical conductors, each of which passes through an electrically insulative bushing in the T/R housing. Such bushings are commonly made of an electrically insulative material, such as porcelain, and have exposed electrically conductive tips for connecting the respectively associated electrical conductors utilized for driving the loads.

Though used for a relatively long period of time, the T/R circuit arrangement in conjunction with the HVS used for driving pairs of loads has several operational and use deficiencies. From a use standpoint, with the HVS immersed in oil within the T/R housing, an operator could not see the positioning of the switch contacts. Accordingly, an operator could not be certain of a grounded contact selection. For safety reasons, then, an operator must provide auxilary grounding connections when the load equipment is to be worked on.

Due to the use of two bushings, and the requirement for physical spacing to avoid arcing, the conduit structure is required to be unduly large.

Functionally the prior art arrangement for a DC power supply has problems. The most serious problem occurs when the HVS is in the selection position to select full wave to be applied to two precipitators. When the field of one precipitator arcs, which can occur from one or two to many times a minute, the stored energy can be discharged through the HVS and the T/R. Further, if an electrical imbalance exists between the two fields, discharge through the power supply can also occur. When the energy stored in the non-arcing field is discharged through the T/R bushings, the air core reactors, and the HVS, damage can occur and the life usefullness of the equipment can be shortened.

In earlier times when the operation of the precipitator was controlled by passive elements, it was felt to be desirable to have the half wave selection. The disadvantages of such a configuration were the saturation of the transformer due to unbalance in the fields, and the reduced energization of each field due to the fact that voltage was applied less than fifty percent of the time. With the advent of electronic controls, the half wave configuration is no longer necessary nor desirable.

OBJECTS

A primary objective of the invention is to provide an improved ground/disconnect switching mechanism for use intermediate a power supply and associated loads.

Another object of the invention is to provide an improved disconnect/ground switching mechanism that allows an operator to visually observe the position of the switching contacts.

Still another object of the invention is to provide an improved disconnect/ground switch that minimizes potential damage to an associated power supply through a discharge of energy from one of the loads.

Yet another object of the invention is to provide an improved disconnect/ground switch assembly for use with a power supply having a single conductor extending through a bushing and having an electrically conductive contact assembly mounted on the bushing in electrical contact with the conductor.

Still another object of the invention is to provide an improved disconnect/ground switch assembly capable of providing safety grounding of each of the associated load devices.

Yet a further object of the invention is to provide an improved disconnect/ground switch smaller in size than prior art switching systems for handling comparable voltage levels.

Still a further object of the invention is to provide an improved disconnect/ground switch that is economical to construct and is easy to maintain.

These and other more detailed and specific objectives will become clear from a consideration of the drawings and the detailed description of the preferred embodiment.

SUMMARY OF THE INVENTION

The invention provides an improved high voltage rectified power supply with an improved disconnect/ground switching mechanism. The disconnect/ground switching mechanism includes a bushing means having a longitudinal opening therethrough, and adapted for mounting on an associated transformer/rectifier housing. The bushing means includes a supporting end. A power conductor means is disposed through the longitudinal opening, and has an end for making electrical connection to a source of power, and a second end for making electrical connection to the rectifier.

A switch mechanism housing is utilized for containing switch mechanism, and is adapted for mounting to an associated power supply. The housing includes an aperture for receiving the bushing through the bottom thereof. It has first and second opposed side walls, each having an aperture therethrough for allowing an electrical conductor to pass into the housing. A top wall is used for supporting a portion of the switch mechanism, and a front wall has a viewing aperture for allowing an operator to view the positions of the switch mechanism.

The switch mechanism includes a first electrical contact supported on the supporting end of the bushing means, and electrically connected the second end of the power conductor. Second and third electrical contacts are mounted to the switch mechanism housing and are adapted to provide connection to ground potential. A pair of electrically conductive switch contacts are are rotatably mounted and are supported from the top wall by insulating means. Each of switch contacts are adapted for selectively making electrical contact with the second and third electrical contacts, respectively, or with the first electrical contact mounted on the bushing. Switch actuators are coupled to the switch contacts and accessable at the exterior of the switch mechanism housing, for allowing actuation of either of the switch contacts to be positioned.

Electrically conductive rollers are mounted on each of the electrical contacts, and are positioned to rotatably engage a portion of the associated ones of switch contacts.

Flanges surround the apertures in the side walls, and are utilized to support conductor conduits, so that the electrical conductors that are used to provide power to the loads can be supported, insulated, and made available for connection electrically to the associated one of the switch contacts.

BRIEF DESCRIPTION OF THE DRAWINGS

The invention in its various scopes and aspects will be understood from a consideration of the following Detailed Description of the Preferred Embodiment, when taken in conjunction with the Drawings, in which.

DESCRIPTION OF THE PREFERRED EMBODIMENT

Figure 1:
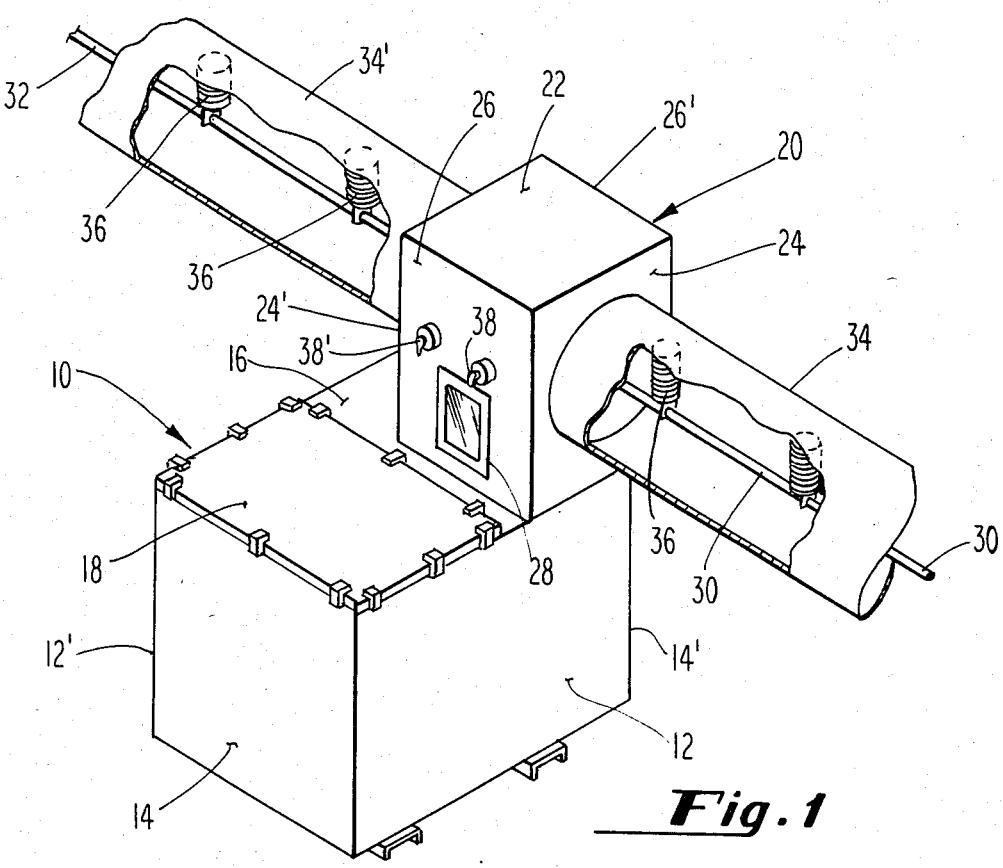
FIG. 1 is a pictorial view of the visible Disconnect/-Ground Switch (DSG) assembly mounted on a DC power supply housing.

FIG. 1 is a pictorial view of the visible Disconnect/-Ground Switch (DSG) assembly mounted on a DC power supply housing. The power supply housing 10 has a pair of side walls 12 and 12', a pair of end walls 14 and 14', a supporting top wall 16, and a cover 18 for providing closure of an access opening to the interior of the housing. The DSG assembly 20 is supported on top wall 16, and includes the switching mechanism (described below), top 22, a pair of side members 24 and 24', a first end member 26 having a viewing aperture covered by a transparent cover 28, and a rear end member 26'. Each side member 24 and 24' has an aperture therethrough for allowing conductors 30 and 32 respectively to be connected to the switching mechanism for making power contact to a pair of loads (not shown). Conductor conduits 34 and 34' are coupled to side members 24 and 24', respectively, and are shown partially broken away to show conductors 30 and 32 supported by a plurality of like type stand-offs 36 along the lengths thereof. The cross-section of the conductor conduit is selected to provide adequate spacing from the conductors for safety from electrical discharge. A pair of switching mechanism actuators 38 and 38' are mounted through front end member 26. Characteristically, the power supply housing 10 and the casing portion of the DSG assembly are electrically connected to ground potential.

Figure 2:
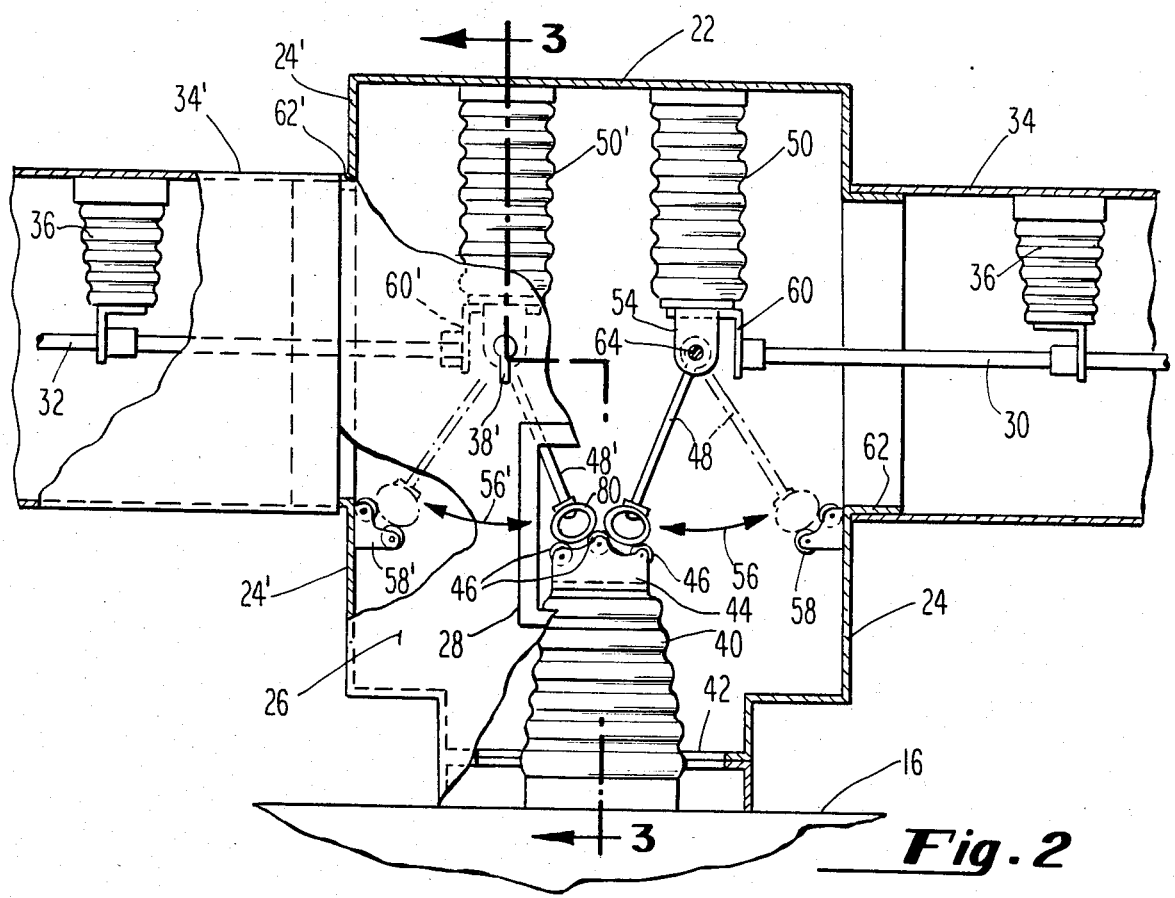
FIG. 2 is a front elevation of the DSG assembly having a portion of the front end member and portions of the conductor conduits cut away to expose the load conductors and supports.

FIG. 2 is a front elevation view of the DSG assembly having a portion of the first end member 26 and portions of conductor conduits 34 and 34' cut away. Elements that have been previously described will bear the same reference numerals to the extent possible for clarity of understanding. A bushing 40 extends upwardly from supporting top wall 16, and extends through an aperture 42 in the bottom of the DSG assembly housing. An electrical contact 44 is physically mounted at the upper end of bushing 40. Characteristically, bushing 40 will be constructed of a non-electrically conductive material such as porcelain, and has a longitudinal opening therethrough, as will be described in more detail below, through which an electrical conductor passes to come in electrical connection to electrical contact 44. The conductor (not shown) is coupled to the power supply (not shown) and makes DC electrical power available at the electrical contact 44. Contact 44 has roller members 46 rotatably mounted thereon for making rolling contact with a flexible contact of each of switch arms 48 and 48'. In another embodiment members 46 may be hard brass crescent shaped shoes.

Switch arm 48 is physically supported by electrically insulating stand-off 50 which is physically mounted to the underside of top member 22. At the lower end of stand-off 50 is an electrically conductive support member 54 that rotatably supports switch arm 48 and allows it to be moved transversely as indicated by arrow 56 to make electrical contact with ground contact 58 which is mounted to side member 24.

A second electrically conductive support member 60 is mounted to the lower end of stand-off 50 and supports the end of conductor 30 in electrical contact therewith. Conductor 30 passes through the aperture in side member 24 through an insulating support member affixed to stand-off 36. A conduit supporting flange 62 is adapted to fit inside conductor conduit 34 to provide a means of mounting the conductor conduit to the side member 24. The arrangement is such, then, that when the switching mechanism actuator 38 (see FIG. 1) is affixed to actuator rod 64, the switch arm 48 can be switched from contact with the electrical contact mechanism 44 whereby power is applied through the switch arm 48, the support member 54, the support member 60, and out through conductor 30 to the load, or can be switched to contact electrical contactor 58 for applying ground connection through the switch arm 48 and to the load.

The other half of the DSG switching mechanism is essentially the same as that just described. Switch arm 48' is arranged for contacting the rollers of electrical contacting mechanism 44 and is supported by stand-off 50'. Through the actuation of switching mechanism actuators 38', switch arm 48' can be switched as indicated by arrow 56' to be brought into electrical contact with ground contactor 58'. A similar aperture exists through side member 24', and includes a conduit supporting flange 62' around the periphery thereof, for supporting conductor conduit 34'. Conductor 32 extends longitudinally through the aperture and is supported by conductive support member 60' and by the support member mounted at the end of stand-off 36. Again, switch arm 48' can be placed in one of two possible electrical contact conditions, one being in power contact with the electrically conductive contact mechanism 44 for receiving power from the power supply, or alternatively in contact with ground contactor 58' for connecting the end of conduit 32 to ground potential.

The transparent cover 28 is purported over an aperture in front member 26, and the aperture is positioned in such a way that the switch arms 48 and 48' are externally visible when in contact with the electrically conductive contact member 44. In this manner, the positioning of the switching mechanism actuators 38 and 38' indicate the power selection for each half of the DSG switching assembly, and the switch arms 48 and 48' are also visible when in the power connected switch position. It is apparent that either switch arms 48 or 48' can be providing power to its associated conductor 30 or 32, or both can be providing power to the conductors 30 and 32, or both can be switched to ground contacts 58 and 58' such that no power is applied to the loads.

Figure 3:
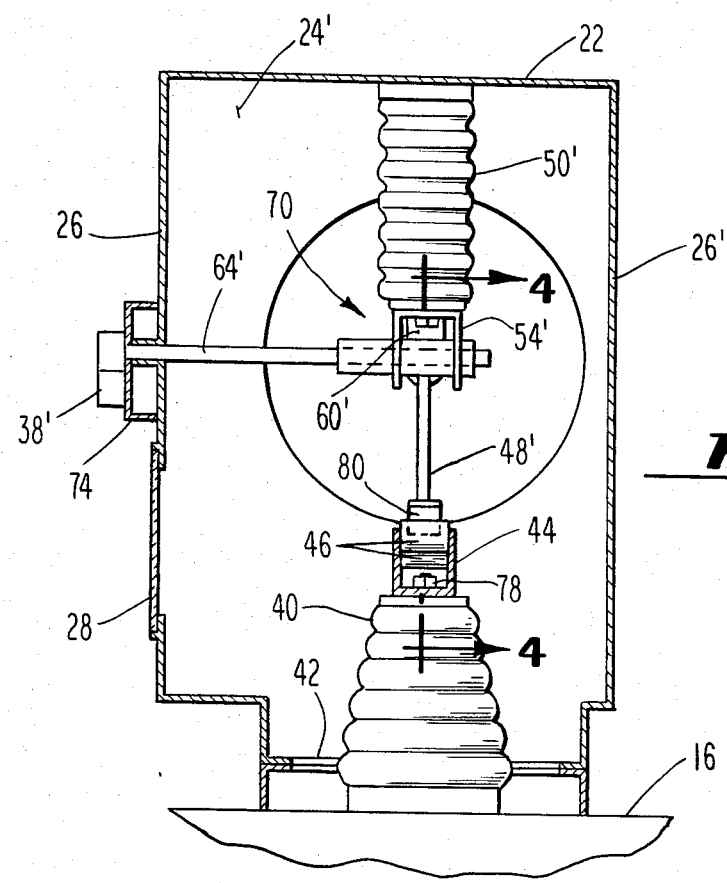
FIG. 3 is a sectional side elevation view taken along lines 3—3 in FIG. 2.

FIG. 3 is a sectional side elevation view taken along lines 3—3 in FIG. 2. The aperture, indicated by arrow 70, through side member 24' is illustrated with relationship to insulated stand-off 50'. The actuator rod 64' has one end engaged by switching mechanism actuator 38' and is rotatably supported through front end member 26 by support 74. The actuator rod 64' has one end of switch arm 48' fixedly mounted thereto, and rotatably supported in electrically conductive support member 54'. A rotational movement of the switching mechanism actuator 38' results in rotation movement of the actuator rod 64' causing switch arm 48' to be moved from one electrical contact position to another.

Figure 4:
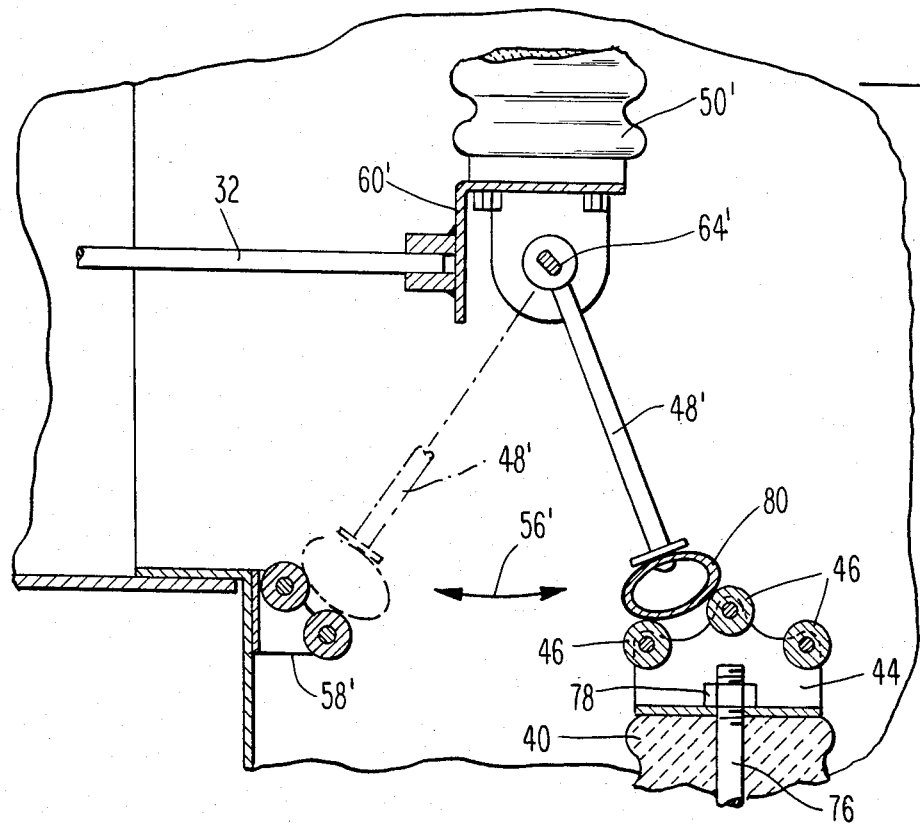
FIG. 4 is an enlarged elevation section view taken along lines 4—4 in FIG. 3.

FIG. 4 is an enlarged elevation section view taken along lines 4—4 in FIG. 3. The section of bushing 40 illustrates conductor 76 passing therethrough, and having a threaded end with a nut 78 for holding the electrically conductive contactor mechanism 44 in electrical contact with conductor rod 76 and in physical contact to be supported by the end of bushing 40.

The switch arm 48 includes an oval shaped end 80 for making a rolling and sliding contact with rollers 46 for making power contact or with the rollers on ground contact 58' for making ground connection. The switch arm 48 and the end contactor member 80 are characteristically constructed of brass or other durable but good electrically conductive materials. The shape of end 80 is such that when in cooperation with rollers 46 results in making positive electrical contact while minimizing damage through arcing when the contact is broken. The roller arrangement is such that the end 80 is appropriately aligned to avoid misalignment and jamming.

Figures 5, 6:
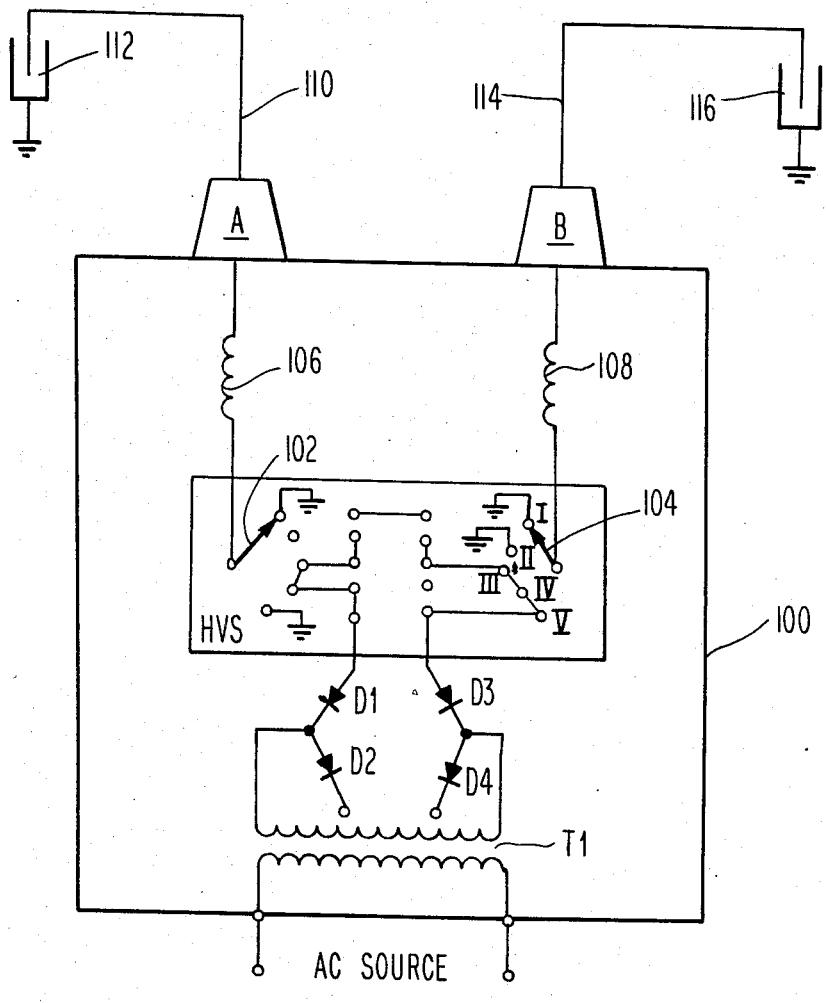
FIG. 5 is a circuit schematic diagram of a prior art switching mechanism for controlling application of DC power to external loads.
FIG. 6 is a table that illustrates the functional selections for each of the 5 positions of the HVS.

Having described the physical structure, its system advantages become readily apparent when considered in light of prior switching arrangements. FIG. 5 is a circuit schematic diagram of a prior art switching mechanism for controlling application of DC power to external loads. A casing 100 is adapted for mounting circuitry and switching mechanism internally, and is adapted for holding oil for immersing the circuit components for providing cooling. The circuitry includes a transformer T1 which has a primary for receiving a source of power from an AC source, and secondary for driving a bridge rectifier comprised of diodes D1, D2, D3, and D4. The bridge rectifier drives a 5-position high voltage switch (HVS) that provides various selectable operations. The switching elements 102 and 104 are coupled through air core reactors 106 and 108, respectively, and through bushings A and B, respectively. The output from bushing A is on conductor 110 to a load, for example a precipitator 112. The output from bushing B is from conductor 114 to a load for example a precipitator field 116.

FIG. 6 is a table that illustrates the functional selections for each of the 5 positions of the HVS.

In operation, when one of the precipitator field 112 or 116 grounds, non-grounding precipitator shorts through the bushing, the HVS, and the bridge rectifier network. Such shorting arises from a sparking or arcing condition as the potential is raised to achieve a thorough particle removal. In precipitator operation it is common for the field to short three times a minute, thereby causing repeated surges of discharge of the other precipitator back into the power supply. The air core reactors 106 and 108 are provided to protect the rectifier circuit by limiting high frequency capacitance discharge current surges, but the protection is not complete, and repeated discharges cause damage to the power supply circuitry.

In the prior art arrangement, the HVS is immersed in oil, is not visible, and an operator must take on faith the power connection indicated by setting the switch selectors 102 and 104. The subject invention has the switching mechanism in air, and visible, thereby providing the positive operator indication as to the status of the switching mechanism. Further, the functioning of the HVS is such that the grounding position provides an electrical circuit ground rather than a safety ground for the equipment and operator.

The prior art HVS provided a half wave (HW) selection, which was used in conjunction with reactors in the control circuit for controlling operation. The operation was of slow response, and with the advent of solid state controls became unnecessary. The half wave energization resulted in the field of a precipitator being energized only approximately half of the time for each cycle, and resulted in inefficient operation. Since the subject invention is intended to function with modern day controls, the half wave selection is not included, there providing an economy of manufacture and structure. In addition to the reduction of energization of each field in the half wave mode, it is noted that the half wave selection has the additional disadvantage of saturation of the transformer due to unbalanced fields.

Figures 7, 8:
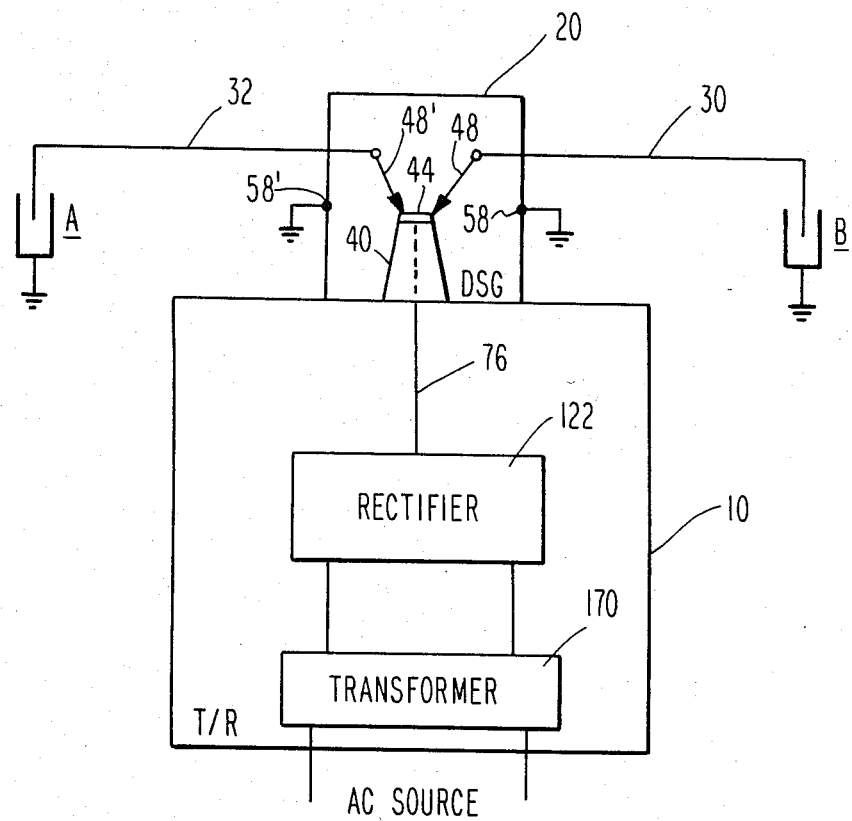
FIG. 7 is a circuit schematic diagram of the disconnect/ground switch of the present invention utilized to drive the pair of loads.
FIG. 8 illustrates the modes of operation available for the disconnect/ground switch of the subject invention.

FIG. 7 is a circuit schematic diagram of the disconnect/ground switch of the present invention utilized to drive the pair of loads. A housing 10 is utilized to contain a transformer 120 for driving a rectifier 122, which in turn provides a high voltage DC source of power on conductor 76. The transformer/rectifier combination is referenced as T/R, and characteristically may be immersed in oil as previously described. The DSG assembly 20 is mounted on the T/R assembly surrounding bushing 40. The switch contact 48 and 48' are coupled to conductors 30 and 32 respectively for driving loads such as precipitator fields B and A respectively.

FIG. 8 illustrates the modes of operation available for the disconnect/ground switch of the subject invention.

Due to the arrangement of the bushing 40, the apertures in wall member 24 and 24', and the arrangement of the conductor conduits 34 and 34', the entire housing 20 can be made materially smaller than would be utilized for other configurations. This follows from the manner in which the conductors 30 and 32 are coupled to switch contacts 48 and 48', and the minimization of spacing while protecting for high voltage discharge. In high voltage systems, for example in the range of 50,000 volts, the air spacing is critical to avoid arc discharging to the housing.

For safety features it is contemplated that the switching mechanism actuators 38 and 38' will be fitted with key locks to prevent tampering with power selections. Details of the switch interlocking is not described in detail, since such interlocks are known.

Having described the disconnect/ground switch in its physical configuration, and in its electrical operation, it is apparent that the objectives have been met. It is recognized that various alterations and changes can be made in the switching mechanism after having considered the foregoing description, without departing from the spirit and scope of the invention. What is intended to be protected by Letters Patent is set forth in the appended claims.

What is claimed is:

1. For use with a high voltage power supply, an improved disconnect/ground switching mechanism comprising:
    bushing means having a longitudinal opening therethrough and a supporting end;
    power conductor means disposed through said longitudinal opening for selectively providing power to a least a pair of loads;
    first electrical contact means supported on said supporting end of said bushing means and in electrical contact with said power conductor means,
    switch mechanism housing means for mounting to a power supply and having a first aperture for receiving said bushing means, first and second opposed side wall members having second and third apertures therethrough, respectively, each for receiving an associated electrical conductor, a supporting top member, and a front end member having a viewing aperture therethrough;
    second and third electrical contact means mounted in said switch mechanism housing means for coupling to a predetermined potential;
    first and second switch contact means rotatably mounted within said switch mechanism housing means, each adapted for selectively making electrical contact with said first electrical contact means, or respectively associated ones of said second and third electrical contact means; and
    switch actuator means coupled to said first and second switch contact means for causing selective actuation of either of said first and second switch means.

2. A disconnect/ground switching mechanism as in claim 1, and further including
    electrically insulating stand-off means mounted intermediate said supporting top member and said first and second switch contact means for providing support of said first and second switch contact means and for insulating said first and second switch contact means from said switch mechanism housing means.

3. A disconnect/ground switching mechanism as in claim 2, wherein said switch mechanism housing includes
    flange means around at least a portion of the periphery of said second and third apertures for providing a means of mounting conductor conduits thereto.

4. A disconnect/ground switching mechanism as in claim 1, wherein said first, second, and third electrical contact means each include
    electrically conductive roller means rotatably mounted thereto and positioned to rotatably engage a predetermined portion of an associated one of said first and second switch contact means.

5. A disconnect/ground switching mechanism as in claim 4, wherein said first and second switch contact means each include
    an electrically conductive elongated body having a mounting end and an oppositely disposed contact portion where said contact portion includes a curved surface for engaging the associated ones of said first, second, and third electrical contact means and said roller means supported thereon.

6. For use in a high voltage rectified power distribution system including at least two loads to be powered, a power source in combination comprising:
    transformer means for providing a source of alternating high voltage;
    rectifier means responsively coupled to said transformer means for rectifying said high voltage;
    first housing means for housing said transformer means and said rectifier means;
    bushing means having a longitudinal opening therethrough, a supporting end, and a mounting end for mounting to said first housing means;
    power conductor means disposed through said longitudinal opening in said bushing means, having a first connection end and a second end coupled to said rectifier means;
    switch mechanism housing means mounted to said first housing means and having a first aperture for receiving said bushing means, first and second opposed side wall members, respectively having second and third apertures, a supporting top member, and a front wall member having a viewing aperture therethrough;
    first electrical contact means supported by and physically mounted on said supporting end of said bushing means in electrical contact with said first connection end of said power conductor means;
    second and third electrical contact means mounted in said switch mechanism housing means, each for providing a source of ground potential;
    first and second switch contact means rotatably supported within said switch mechanism housing means and electrically insulated therefrom, each having a first contact end adapted for selectively making electrical contact with said first electrical contact means, or an associated one of said second and third electrical contact means, and each having a power end for being electrically coupled to an associated load conductor; and switch actuator means coupled to each of said first and second switch contact means for selectively actuating said first and second switch contact means to make electrical contact with the selected ones of said first, second, and third electrical contact means.

7. A power source as in claim 6, wherein said first, second, and third electrical contact means each include
electrically conductive roller means rotatably mounted thereto and positioned to rotatably engage a predetermined portion of an associated one of said first and second switch contact means.

8. A power source as in claim 7, wherein said first and second switch contact means each include
an electrically conductive elongated body having a mounting end and an oppositely disposed contact portion where said contact portion includes a curved surface for engaging the associated ones of said first, second, and third electrical contact means and said roller means supported thereon.

9. A power source as in claim 8, and further including
electrically insulating stand-off means mounted intermediate said supporting top member and said first and second switch contact means for providing support of said first and second switch contact means and for insulating said first and second switch contact means from said switch mechanism housing means.

10. A power source as in claim 9, wherein said switch mechanism housing means includes
flange means around at least a portion of the periphery of said second and third apertures for providing a means of mounting conductor conduits thereto.

11. A power source as in claim 10, and further including
first and second load conductor means, each having a first end electrically coupled to said mounting end of an associated one of said first and second switch contact means, and a second end for coupling to an associated load and for carrying power thereto;
first and second conductor conduit means, each for at least partially surrounding an associated one of said first and second load conductors, and each having a mounting end for engaging an associated one of said flange means; and
a plurality of electrically insulating stand-off means mounted in each of said first and second conductor conduit means for physically mounting and positioning an associated one of said first and second load conductor means.

12. For use in a high voltage rectified power distribution system including at least two loads to be powered, conductors to carry power to the loads, a transformer for providing a source of alternating high voltage, a rectifier coupled to the transformer for rectifying the voltage, and a transformer/rectifier housing, an improved disconnect/ground switching mechanism comprising:
bushing means having a longitudinal opening therethrough, a supporting end, and a mounting end for mounting to the transformer/rectifier housing;
power conductor means disposed through said longitudinal opening in said bushing means having a first connection end and a second end for coupling to the rectifier;
switch mechanism housing means for mounting to the transformer/rectifier housing and having a first aperture for receiving said bushing means, first and second opposed side wall members, respectively having second and third apertures, flange means around at least a portion of the periphery of said second and third apertures, a supporting top member, a front wall member having a viewing aperture therethrough;
first electrical contact means supported by and physically mounted on said supporting end of said bushing means in electrical contact with said connection end of said power conductor means;
second and third electrical contact means mounted in said switch mechanism housing means, each for providing a source of ground potential;
roller means rotatably mounted on each of said first, second, and third electrical contact means;
first and second switch contact means, each having an electrically conductive elongated body having a mounting end and an oppositely disposed contact portion, where said contact portion includes a curved surface for engaging the associated ones of said first, second, and third electrical contact means and said roller means supported thereon;
electrically insulating stand-off means mounted intermediate said supporting top member and said first and second switch contact means for providing rotatable support of said first and second switch contact means and for insulating said first and second switch contact means from said switch mechanism housing means, said stand-off means including first electrically conductive support means for rotatably coupling to said mounting end of each of said switch contact means, and second electrically conductive support means for supporting and electrically coupling each of said switch contact means to an associated one of the conductors; and
switch actuator means coupled to said mounting end of each of said first and second switch contact means for selectively actuating said first and second switch contact means to make electrical contact with the selected ones of said first, second, and third electrical contact means.

* * * * *